June 15, 1954   J. B. HIRSCHMANN ET AL   2,680,882
APPARATUS AND METHOD OF MAKING GOGGLES
Filed Jan. 10, 1951   3 Sheets-Sheet 1
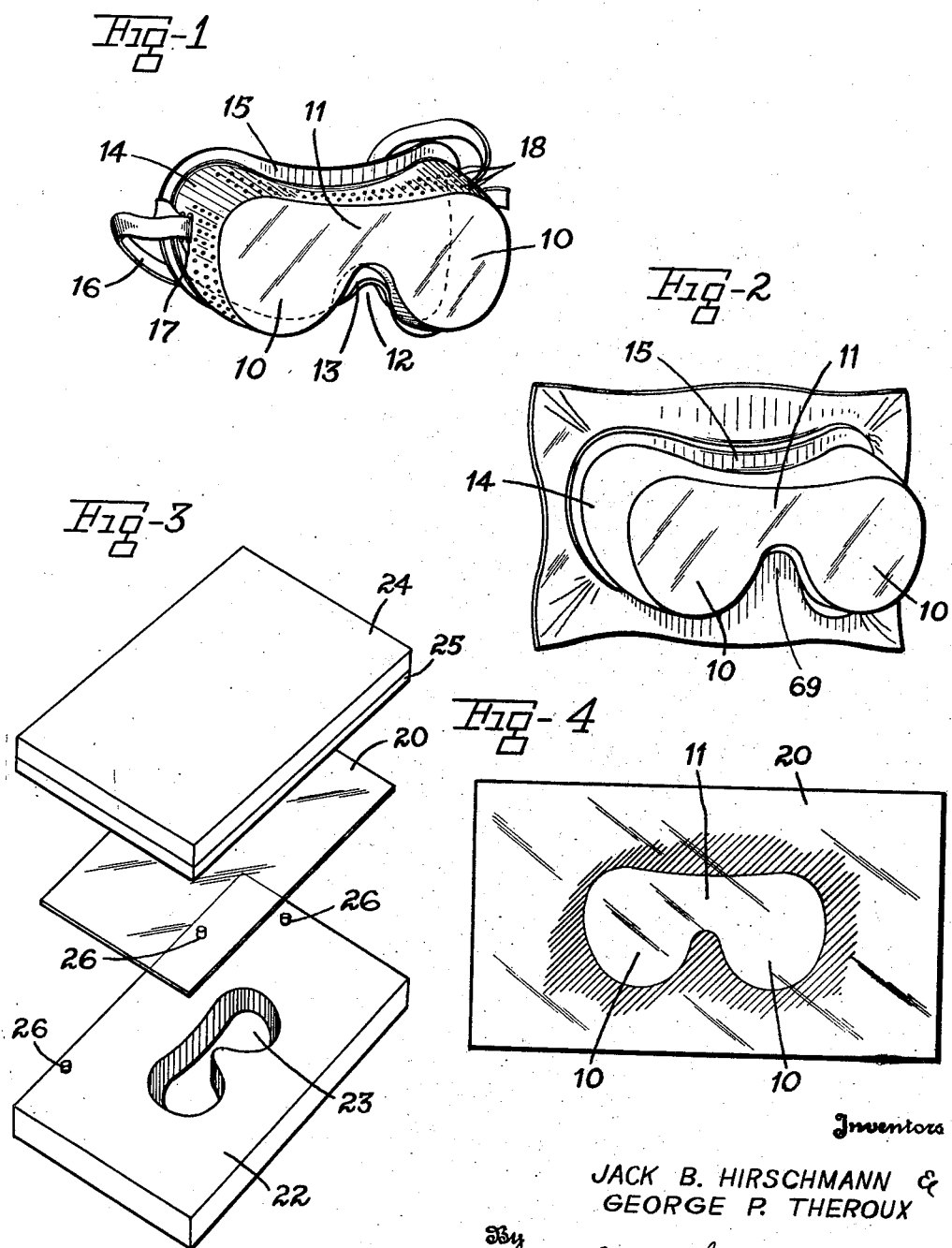
Inventors
JACK B. HIRSCHMANN &
GEORGE P. THEROUX
By Marechal & Biebel
ATTORNEYS

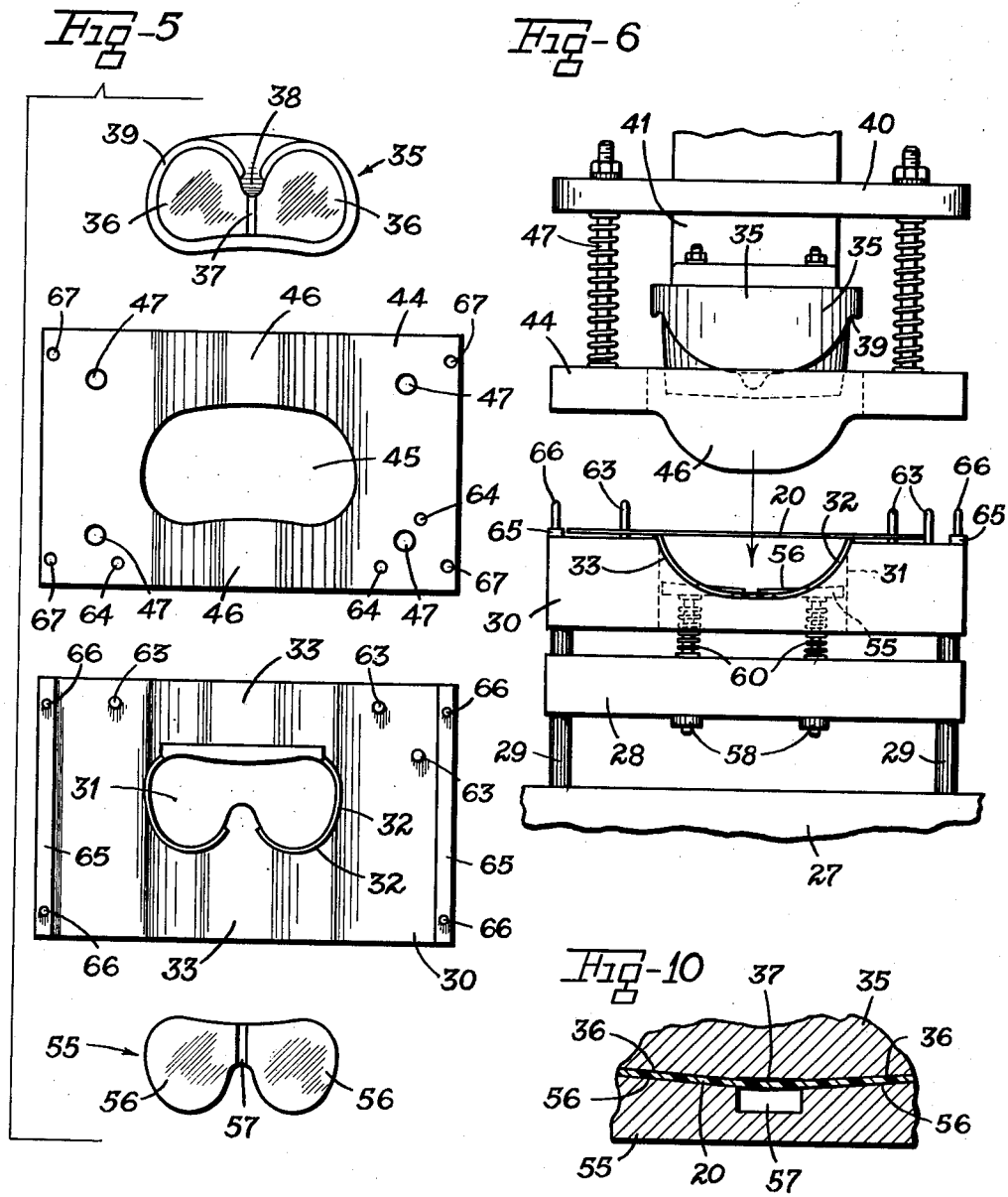

June 15, 1954  J. B. HIRSCHMANN ET AL  2,680,882
APPARATUS AND METHOD OF MAKING GOGGLES
Filed Jan. 10, 1951  3 Sheets-Sheet 3
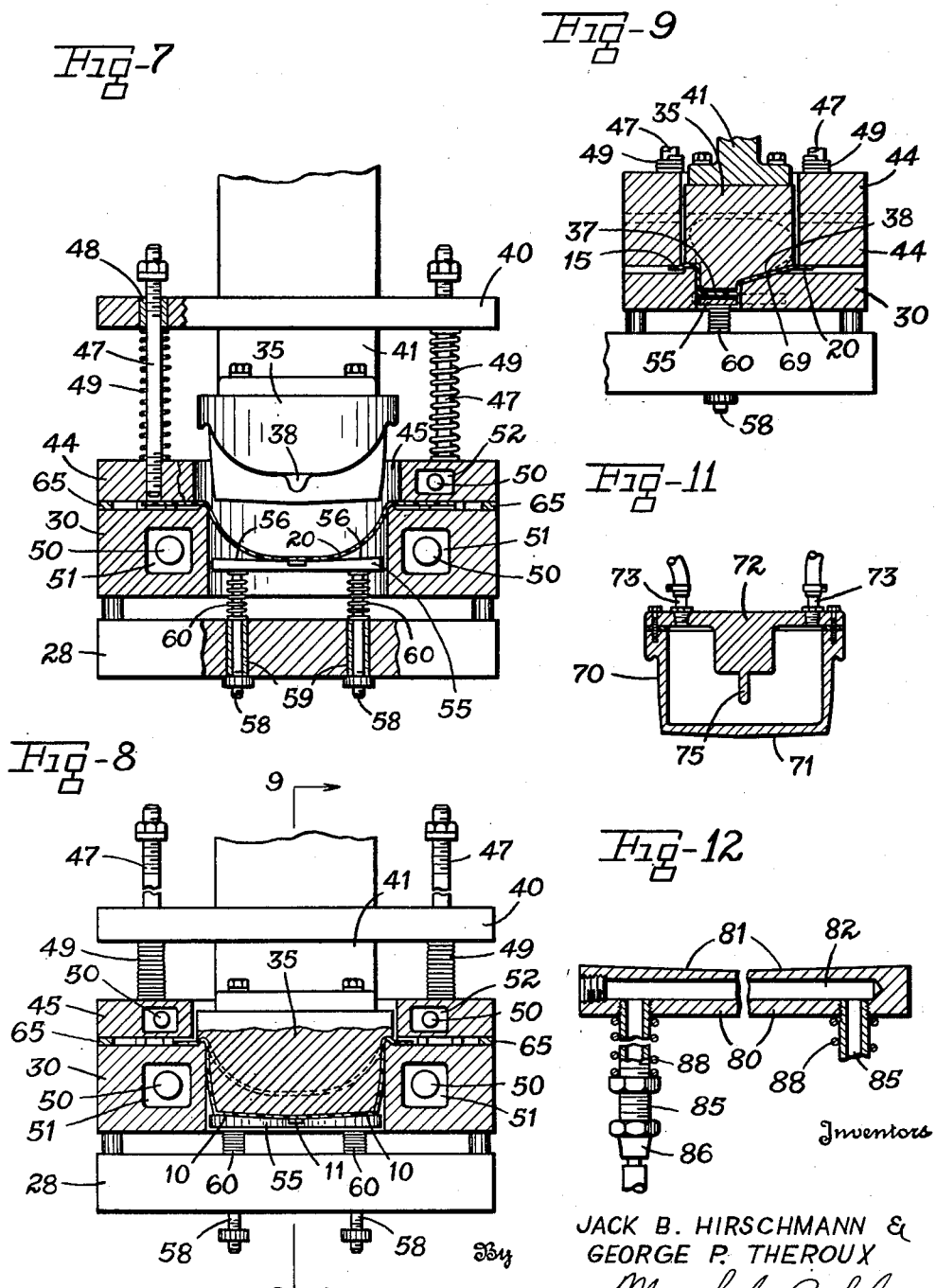
Inventors
JACK B. HIRSCHMANN &
GEORGE P. THEROUX
Marechal & Biebel
ATTORNEYS Patented June 15, 1954

2,680,882

UNITED STATES PATENT OFFICE 2,680,882

APPARATUS AND METHOD OF MAKING GOGGLES

Jack B. Hirschmann, Fairhaven, and George P. Theroux, Buzzards Bay, Mass.; said Theroux assignor to said Hirschmann Application January 10, 1951, Serial No. 205,328

20 Claims. (Cl. 18—19)

This invention relates to goggles, and more particularly to a goggle drawn or molded from sheet plastic material and to apparatus and a method for making such a goggle.

The principal object of the invention is to provide a goggle which includes a lens portion and a frame formed as a single piece from a sheet plastic blank, which is light in weight and economical to produce, and in which the lens area of the goggle is optically clear and free from strains.

In accordance with the invention, a goggle of high optical properties in the lens area thereof may be formed from a single blank of transparent sheet plastic of desired initially high optical properties by combined steps of controlled heating and drawing such that the optical properties of the lens area of the blank are substantially unaffected while the remainder of the blank is drawn into the desired configuration to form the frame portion of the goggle. In order to accomplish this result, the heat applied to the blank, to soften it properly for ready drawing or molding, is controlled in such manner that only the portions of the blank outside the lens area are softened, so that drawing takes place substantially entirely in these outer portions while the lens portion is clamped or locked against deformation between cooperating parts of the forming apparatus, and the desired maintained optical properties of the lens area may be further aided by positive cooling of this portion of the blank during the drawing operation to maintain the desired high optical clarity therein without the necessity for further polishing operations.

A goggle having these desired characteristics may also be formed in accordance with the invention from a plastic sheet blank having a matte or otherwise optically imperfect surface by following a similarly controlled heating and drawing procedure in which the parts of the forming apparatus which clamp the lens portion of the blank are provided with highly polished clamping surfaces and are heated sufficiently to effect localized softening and press polishing of the surface of the lens portion of the blank. Thus while the outer portions of the blank are drawn into the desired frame shape, the lens portion is held against deformation and is simultaneously press polished to the desired optical clarity without the introduction of optical strains and without requiring subsequent polishing.

It is accordingly an object of the invention to provide a method of fabricating a goggle from sheet plastic of high optical properties in which the sheet is subjected to combined steps of heating and drawing under controlled conditions of localized application of heat and pressure to form the frame portion of the goggle from portions of the sheet blank outside the lens portion of the blank while leaving the optical properties of the lens area substantially unaffected and unimpaired.

Another object is to provide a method of fabricating a goggle from a sheet plastic blank in which the lens area of the blank is press polished without the introduction of optical strains while the outer portions of the blank are being drawn to form the frame of the goggle.

It is also an object of the invention to provide apparatus for fabricating a goggle of high optical clarity from sheet plastic material by the application of heat and drawing pressure to a sheet blank which will effect drawing of the frame portion of the goggle from the area of the blank outside the lens portion thereof while protecting the lens area of the blank from heat and physical stress capable of undesirably affecting its optical properties.

Other objects and advantages of the invention will be apparent from the following description, the accompanying drawings and the appended claims.

In the drawings—

Fig. 1 is a perspective view of a goggle produced in accordance with the invention;

Fig. 2 is a perspective view of the goggle following the drawing operation of the invention and prior to the trimming and finishing steps thereon;

Fig. 3 is an exploded perspective of the starting blank of sheet plastic and the preliminary heating device therefor;

Fig. 4 is a plan view of the blank following the preliminary heating step;

Fig. 5 is an exploded elevational view of the major component parts for drawing or molding the blank to form the goggle;

Fig. 6 is a front elevational view showing the drawing apparatus in position for operation;

Fig. 7 is a view illustrating an intermediate step in the drawing operation and taken partly in elevation and partly in section;

Fig. 8 is a view similar to Fig. 7 showing the parts at the conclusion of the drawing operation;

Fig. 9 is a section on the line 9—9 of Fig. 8;

Fig. 10 is an enlarged fragment of the central portion of Fig. 8;

Fig. 11 is a detail view in section showing a modified construction of the forming plunger; and Fig. 12 is a fragmentary section showing a modified construction of the lens plate.

Referring to the drawings, which illustrate preferred embodiments of the invention, Fig. 1 shows a goggle produced in accordance with the invention from transparent sheet plastic material such as cellulose acetate, cellulose nitrate or methyl methacrylate, satisfactory results having been obtained with these materials in sheet thicknesses ranging from 0.030 to 0.060 inch, and the sheet may be clear or may be colored as desired for particular light absorbing properties. As shown, this goggle includes a continuous lens portion comprising both eyepiece portions 10 and a connecting portion 11 overlying the cutout 12 for the nose of the wearer, each of the eyepiece portions 10 being substantially flat and the portion 11 being slightly curved to position the eyepiece portions 10 at a corresponding angle to each other. A nose piece 13 such as a suitable plastic member is readily fitted in the cutout 12 and adhered to the adjacent portion of the goggle.

The goggle also includes a frame portion 14 integral with the lens portion 10 and extending rearwardly therefrom, this frame portion being formed to fit the curvature of the face of the wearer and being provided with a flared or flanged portion 15 adapted to fit comfortably against the wearer's face. A head strap 16 may be secured to the frame portion 14 in any suitable way and is shown as having each end thereof threaded through a pair of slots 17 at the sides of the frame portion 14 to leave each end of the strap projecting for frictional gripping by the body of the strap against the outside of the frame in use. A plurality of holes 18 for ventilation purposes may also be provided in the frame portion 14 as shown in Fig. 1.

Figs. 2-8 illustrate several stages in the production of a goggle as shown in Fig. 2 from a single blank of transparent sheet plastic material such as is indicated at 20 in Fig. 3. Preferred results have been obtained in production if this blank is subjected to a preliminary heating step before it is placed in the drawing apparatus, with the heat being carefully controlled to soften only the area of the blank which lies outside the lens area corresponding to the portions 10 and 11 in Fig. 1, and Fig. 3 shows a heating unit 22 for carrying out this heating step.

The part 22 is a plate which is heated either by the incorporation of electric heating elements therein or by applying heat thereto from an external source. In the center of plate 22 is a cavity 23 of substantially exactly the size and shape as the goggle lens area 10—11, and this cavity may be left as a space in the plate or it may be filled with a cored or hollow filler connected with a suitable source of circulating coolant. Thus when the blank 20 is held in contact with this plate 22, the portion directly overlying the cavity 23 will not be heated, while the surrounding portion of the blank is directly in contact with the heated surface.

In order to hold the blank 20 in properly effective contact with the plate 22, a pressure plate 24 may be laid over the blank and pressed down as by the fingers of the operator, the pressure plate 24 having a felt or other padded surface 25 to prevent scratching the surface of the plastic. This heating step should be continued for a sufficient interval to effect substantial softening of the outer area of the blank, for example from 8 to 30 seconds depending upon the thickness and other characteristics of the sheet, and at temperatures correlated with the softening range of the plastic, a temperature up to about 140° F. being satisfactory for cellulose acetate.

In order to register the blank 20 accurately with respect to the cavity 23 for proper subsequent registry of the heated blank with the drawing members, a plurality of locating pins 26 are mounted in the surface of heating plate 22, and these pins are preferably spring loaded for depression by the pressure plate 24. After the blank has been heated by means of this heating unit, it has the general appearance indicated in Fig. 4, with the lens area 10—11 remaining as clear and smooth as in the original sheet. The surrounding area, however, is soft and will wrinkle when cooled, and its optical clarity is relatively impaired.

Fig. 5 shows the major parts for carrying out the drawing or forming operation on the heated blank, and these parts may be mounted in any suitable drawing apparatus such as a press having a base or bed plate 27 as indicated in Fig. 6, the bottom members of the drawing apparatus being supported by a plate 28 mounted above the bed plate 27 by means of bolts 29. The lowermost of these forming or drawing members is a drawing ring 30 in which is a cavity 31 having substantially the same shape as the outer configuration of the goggle and provided with a bead 32 around the major portion of its upper periphery. The part 30 also has trough portions 33 at either side of the cavity 31 corresponding to the portions of the goggle above and below the lens which fit the curvature of the wearer's face.

A male forming member or plunger 35 has a surface conforming to the inner surface of the lens area 10—11 of the finished goggle and including plane surfaced eye portions 36, which are inclined at a small angle from a common plane, and a connecting portion 37 is flattened normally to the vertical axis of the plunger. Another portion 38 at the end of the plunger 35 slants away from the portions 36 and 37 and corresponds to the cutout for the nose in the goggle, and the plunger also includes a lip 39 adapted to cooperate with the bead 32 on forming member 30 to provide a smoothly curved junction between the frame 14 and flange 15 in the finished goggle. With the part 30 rigidly mounted on the base plate 27 of a press as shown, the part 35 may be mounted on the platen 40 of the press by means of a suitable bracket support 41.

A stripper plate 44 serves as a blank holder in cooperation with the outer forming member 30, and it has a cavity 45 therethrough for receiving the plunger 35 and also includes curved portions 46 adapted to be received within the trough portions 33 of part 30. The stripper plate 44 is mounted on the press platen 40 in movable relation with plunger 35, by means of bolts 47 slidable in fixed bushings 48 and provided with springs 49. Provision is made for heating both the parts 30 and 44, for example by means of electrical elements indicated at 50 as mounted in suitable recesses 51 and 52 in parts 30 and 44 respectively.

A lens plate 55 is mounted for movement within the cavity 31 in part 30, and its upper surface closely conforms to the desired outer surface of the lens area of the goggle and includes two flat portions 56 inclined toward each other in a shallow V-shape at substantially the same angle as the surface portions 36 of plunger 35. Between these portions 56 is a groove 57 across the face of the plate of substantially the same width as the flat portion 37 on the end of plunger 35, as best seen in Fig. 10. As shown, the lens plate 55 is yieldably mounted within the cavity 31, by means of pins 58 slidable in bushings 59 set in the plate 28, and relatively strong springs 60 are provided on pins 58 between plate 28 and the undersurface of the lens plate 55.

Fig. 6 illustrates the relative positions of the parts at the start of the forming or drawing operation. The heated blank 20 is placed on the upper surface of the outer drawing member 30 with its unheated lens area accurately registered with the cavity 31, which may be readily accomplished by the provision of registering or indexing pins 63 arranged in the part 30 in the same relative positions as the pins 26 in the heater plate 22 as described, and receivable in bores 64 aligned therewith in the stripper plate 44. In the first forming step, the press is actuated to bring the platen 40 downward, as indicated by the arrow in Fig. 6, and this movement first brings the stripper plate 44 down on the part 30, clamping the periphery of the sheet against part 30 and simultaneously forming the center portion of the blank into curved shape in the troughs 33, this position being shown in Fig. 7.

As the platen 40 continues downwardly from the position shown in Fig. 7, the springs 49 are compressed to maintain the stripper plate 44 in blank holding position, and the plunger 35 first engages the inner surface of the lens area of the blank and clamps it firmly against the lens plate 55. Thereafter the parts 35 and 55 move downwardly together against the springs 58, with the lens area of the blank being held firmly between the opposed surfaces 36 and 56 of the plunger and lens plate respectively so that the forming action is effective substantially entirely on the peripheral portions of the blank. Figs. 8 and 9 show the relative positions of the parts upon completion of the drawing or forming stroke, and preferred results have been obtained by causing the parts to remain in this position for an appreciable interval, for example from 8 to 15 or 20 seconds depending upon the thickness of the sheet, which causes the plastic to set in its drawn form before it is removed from the mold and cooled.

It has been found desirable to employ means for limiting the clamping or blank holding action of the stripper plate 44 with respect to the drawing member 30, as by the provision of suitable shims 65 held therebetween by dowel pins 66 adjacent the ends of member 30 which serve as guide dowels for the stripper plate 44 and are received in bores 67 therein. The shims 65 thus form shoulders maintaining the adjacent surfaces of the parts 30 and 44 in closely spaced relation, and when such shims are used in thicknesses of the order of a few thousandths greater than the initial thickness of the sheet, the plastic material in the peripheral portions of the blank is effectively metered or ironed out during the forming operation. Thus the plastic is allowed to draw freely without great pressure thereon so long as it does not wrinkle, but as soon as it begins to wrinkle or buckle, it comes into contact with the heated surface of the stripper plate 44 and is thus again ironed out smoothly.

When the drawing parts are constructed and arranged as described, and with heat directly applied to the blank only in the portions thereof outside the lens area both in the preheating step and by heating only the parts 30 and 44, the drawing force is effective only in this peripheral portion of the blank, and this result is further aided by the clamping and locking of the lens area between the parts 35 and 55, which are unheated and are sufficiently cooled by convection to maintain them at a temperature substantially below the softening range of the plastic blank. Accordingly, if the plastic is initially selected with adequately high optical properties, including adequately smooth surfaces, these properties are maintained unaffected throughout the forming operation, and the lens area is prevented from distortion and the development of strains capable of affecting its optical properties. The provision of the flattened center strip across the area 37 on the plunger face in cooperation with the groove 57 in the lens plate is also an aid in accomplishing this result, since it gives sufficient clearance between the plunger and lens plate at the center of the lens area, as shown in detail in Fig. 10, for the blank to assume a natural curve between the relatively inclined eye portions 10 without the introduction of strain.

After completion of the drawing operation, the goggle has the general appearance illustrated in Fig. 2, with the frame and flange portions formed as shown from the areas of the blank outside of the lens area. To complete the goggle it may first be roughly trimmed on a bandsaw or other suitable tool to remove the excess portions of the peripheral flange and the web 69 in the nose receiving portion of the frame, after which it may be smoothly trimmed by means of a router, preferably with the aid of a suitable holding jig. The ventilation holes and the slots for the ends of the headstrap are punched as required, and finally the nose piece 13 is secured in place by means of a suitable adhesive or solvent bond.

The method and apparatus of the invention are also applicable to the production of goggles as shown in Fig. 1 from a sheet plastic blank having matte, scratched or otherwise inadequately clear surfaces. In order to accomplish this result, substantially the same steps are followed with the exception that heat is applied to the plunger and lens plate for the purpose of softening and press polishing the lens area during the forming operation, and Figs. 11 and 12 illustrate modified constructions for the plunger and lens plate for use in this forming operation.

In Fig. 11, the plunger 70 is shown as a hollow body 70 having substantially the same configuration as the plunger 35 and with its surface 71 optically smooth. A cover 72 is secured to the plunger body 70 and is bored at either end to receive inlet and outlet connections 73 for circulating steam or other heated fluid through the plunger body. It will be noted that the cap 72 includes a baffle portion 75 for assuring adequate contact of the heated fluid with the portions of the plunger closest to its forming surface 71.

The lens plate 80 in Fig. 12 has an upper surface 81 formed as described in connection with the surface 56 of the lens plate 55 and optically smooth. The lens plate 80 is cored at 82 for circulation therethrough of a heated fluid, and the dowels 85, which correspond to the pins 58, are shown as hollow for attachment at 86 to suitable inlet and outlet conduits for the heated fluid. It will be noted also that this same construction of the plunger and lens plate may be used in conjunction with a supply of coolant in forming goggles from sheet blanks of high optical properties if desired.

In forming a goggle from a blank of inadequately smooth surface by means of the plunger 70 and lens plate 80, the preheating step is essentially the same as described in connection with Fig. 3, in order to effect through softening of the blank only in the portions thereof outside the desired lens area. Thus when the blank is inserted in the forming apparatus and subjected to the forming steps described in connection with Figs. 6 to 8, the same desired result of limiting the effective forming action to this portion of the blank is obtained, and the lens area is maintained free of distortion and the development of optical strains. However, with the plunger and lens plate heated sufficiently to soften the surface of the lens area of the blank, effective press polishing of this portion of the blank is accomplished as a result of the softening action of the heated plunger and lens plate in conjunction with their firm clamping grip on opposite surfaces of the lens area through operation of relatively strong springs 88 on the dowels 85.

A goggle of the characteristics shown in Fig. 1 can thus be produced in a single simple forming operation either from a sheet of plastic material of high optical properties or from a sheet having a scratched or otherwise imperfect surface, and in either event the manufacturing procedure is simple and economical. It will also be apparent that the same procedure is equally applicable to the production of goggles having the lens portion curved either cylindrically or spherically as well as flat. With such lens portion clamped as described between complementarily curved surfaces of a plunger and lens plate, the desired optical characteristics are maintained or developed without developing power in the lens and without introducing strains. Thus in all such forms of the invention, the goggles produced thereby are characterized by substantially complete freedom of strains capable of showing photoelastic effects in polarized light, even though such effects may be clearly in evidence in the frame portions of the goggle, thus readily distinguishing the product of the invention from goggles of otherwise apparently similar properties and configuration which are not formed in accordance with the invention.

Reference is made to our copending application Serial No. 413,602, filed March 2, 1954 as a division of this application.

While the articles, methods and forms of apparatus herein described constitute preferred embodiments of the invention, it is to be understood that the invention is not limited to these precise articles, methods and forms of apparatus, and that changes may be made therein without departing from the scope of the invention which is defined in the appended claims.

What is claimed is:

1. Apparatus for drawing from a blank of thermoplastic sheet material a goggle of generally cup-shape having the lens portion thereof integral with a frame portion of substantial depth including an inner edge adapted to fit the face of the wearer, comprising a male drawing member proportioned to define the inner configuration of both the lens and said frame portion of said goggle, said drawing member having a smooth end surface defining the inside of said lens portion, a clamping member having a smooth surface defining the outside of said lens portion of said goggle, means for clamping said blank with substantial pressure between said clamping member and said end surface of said drawing member, means movable with respect to said male drawing member and said clamping member for gripping the portion of said blank surrounding said lens portion with controlled lesser pressure than the pressure of said clamping means on said lens portion, and means for causing relative drawing movement of said drawing member and said gripping means while maintaining said clamping action of said clamping means on said lens portion of said blank to confine the resulting drawing action on said blank to said gripped portion thereof and thereby to prevent deformation of said lens portion and the development of optical strains therein.

2. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for gripping the portion of said blank means surrounding said lens portion thereof, a male forming member movable with respect to said gripping means defining the inner configuration of said goggle and including a surface adapted to engage the inner surface of said lens portion, means for effecting a forming stroke of said forming member with respect to said gripping means, a holding member having a surface conforming with the outer surface of said lens portion, and means for maintaining said holding member and said forming member in clamping relation with said lens portion with substantially greater pressure than the pressure of said gripping means on said blank during said forming stroke to minimize deformation and the development of strains in said lens portion.

3. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for gripping the portion of said blank surrounding said lens portion thereof, a male forming member movable with respect to said gripping means defining the inner configuration of said goggle and including a surface adapted to engage the inner surface of said lens portion, means for effecting a forming stroke of said forming member with respect to said gripping means, a holding member having a surface conforming with the outer surface of said lens portion, means for maintaining said holding member and said forming member in clamping relation with said lens portion with substantially greater pressure than the pressure of said gripping means on said blank during said forming stroke to minimize deformation and the development of strains in said lens portion, means for effecting through heating of the portion of said blank outside said lens portion for softening thereof, and means for maintaining the temperature of said lens portion below the softening range thereof during said forming stroke to limit the forming action of said forming members to said outer portion of said blank.

4. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for gripping the portion of said blank surrounding said lens portion thereof, a male forming member movable with respect to said gripping means defining the inner configuration of said goggle and including a surface adapted to engage the inner surface of said lens portion, means for effecting a forming stroke of said forming member with respect to said gripping means, a holding member having a surface conforming with the outer surface of said lens portion, means for maintaining said holding member and said forming member in clamping relation with said lens portion with substantially greater pressure than the pressure of said gripping means on said blank during said forming stroke to minimize deformation and the development of strains in said lens portion, means for effecting through heating of the portion of said blank outside said lens portion for softening thereof, and means for cooling said lens portion during said forming stroke to prevent softening and deformation thereof.

5. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for gripping the portion of said blank surrounding said lens portion thereof, a male forming member movable with respect to said gripping means defining the inner configuration of said goggle and including a surface adapted to engage the inner surface of said lens portion, means for effecting a forming stroke of said forming member with respect to said gripping means, a holding member having a surface conforming with the outer surface of said lens portion, means for maintaining said holding member and said forming member in clamping relation with said lens portion with substantially greater pressure than the pressure of said gripping means on said blank during said forming stroke to minimize deformation and in development of strains in said lens portion, means for effecting through heating of the portion of said blank outside said lens portion for softening thereof, and means for heating said male forming member and said holding member to a temperature above the softening range of said blank but lower than the temperature of said outside blank portion to effect press polishing of said lens portion while preventing deformation and the development of strains therein.

6. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for gripping the portion of said blank surrounding said lens portion thereof, a male forming member movable with respect to said gripping means defining the inner configuration of said goggle and including a surface adapted to engage the inner surface of said lens portion, means for effecting a forming stroke of said forming member with respect to said gripping means, a holding member having a surface conforming with the outer surface of said lens portion, means for maintaining said holding member and said forming member in clamping relation with said lens portion with substantially greater pressure than the pressure of said gripping means on said blank during said forming stroke to minimize deformation and the development of strains in said lens portion, said surface of said holding member including two substantially flat portions inclined towards each other and adapted to define the eye portions of said lens portion, said surface of said male forming member including two similar flat portions inclined towards each other at substantially the same angle, and each said surface including a relieved central portion defining a clearance space for the central portion of said lens portion between said clamping surfaces when said eye portions are in clamped position to provide for free curvature of said central portion of said blank while further minimizing the development of strains therein.

7. Apparatus for drawing from a blank of thermoplastic sheet plastic material a goggle of generally cup-shape having the lens portion thereof integral with a frame portion of substantial depth including an inner edge portion adapted to fit the face of the wearer, comprising a female drawing member adapted to receive said blank thereon, said drawing member having a cavity therein defining the outer configuration of said goggle, a male drawing member defining the inner configuration of said goggle, means for effecting a forming stroke of said male drawing member into said cavity to draw said blank into the frame of said goggle, an outer holding member mounted for movement with respect to said female drawing member in advance of said male drawing member to hold the portion of said blank outside the lens portion thereof against said female drawing member, an inner holding member positioned within said cavity and movable with respect to said female drawing member, and yieldable means for supporting said inner holding member in clamping engagement with the surface of said lens portion of said blank opposite said male drawing member with greater pressure than the pressure of said outer holding member and said male drawing member on said blank to confine the drawing action on said blank to said outer blank portion and thereby to minimize distortion of said lens portion during said forming stroke of said male drawing member.

8. Apparatus for drawing from a blank of thermoplastic sheet plastic material a goggle of generally cup-shape having the lens portion thereof integral with a frame portion of substantial depth including an inner edge portion adapted to fit the face of the wearer, comprising a female drawing member adapted to receive said blank thereon, said drawing member having a cavity therein defining the outer configuration of said goggle, a male drawing member defining the inner configuration of said goggle, means for effecting a forming stroke of said male drawing member into said cavity to draw said blank into the frame of said goggle, an outer holding member mounted for movement with respect to said female drawing member in advance of said male drawing member to hold the portion of said blank outside the lens portion thereof against said female drawing member, means for maintaining the opposed surfaces of said outer holding member and said female drawing member in predetermined spaced relation providing for free flowing of said blank therebetween while preventing wrinkling of said blank during said forming stroke of said male drawing member, an inner holding member positioned within said cavity and movable with respect to said female drawing member, and means for supporting said inner holding member in firm clamping engagement with the surface of said lens portion of said blank opposite said male drawing member to minimize distortion of said lens portion during said forming stroke of said male drawing member.

9. Apparatus for drawing from a blank of thermoplastic sheet plastic material a goggle of generally cup-shape having the lens portion thereof integral with a frame portion of substantial depth including an inner edge portion adapted to fit the face of the wearer, comprising means for preheating the portion of said blank outside the lens portion thereof to soften said outer portion for ready forming while retaining said lens portion at a substantially lower temperature, a pair of forming members having surface portions cooperating with the inner and outer surface of said lens portion of said goggle, means for registering said preheated blank with respect to said forming members to locate said lens portion thereof aligned with said surface portions of said forming members, means for executing a forming stroke of said plurality of said forming members, means cooperating with said forming members during said forming stroke to apply heat to said outer portion of said blank to maintain the same in softened condition, and means for effecting firm clamping of said lens portion of said blank between said surfaces of said pair of forming members during said forming stroke to confine the drawing action on said blank to said outer portion thereof and thereby to minimize deformation of the development of strains in said lens portion.

10. Apparatus for drawing from a blank of thermoplastic sheet plastic material a goggle of generally cup-shape having the lens portion thereof integral with a frame portion of substantial depth including an inner edge portion adapted to fit the face of the wearer, comprising a heating plate for effecting preheating of said blank, said plate having a cavity therein defining the outer configuration of said lens portion, means on said heating plate for registering said blank in predetermined relation with said cavity therein to limit the heating action of said plate to the portion of said blank outside said lens portion, means separate from said heating plate for gripping the portion of said preheated blank surrounding said lens portions thereof, a male forming member movable with respect to said gripping means for defining the inner configuration of said goggle and including a surface adapted to engage the inner surface of said inner portion, locating means on said gripping means arranged in predetermined relation with said registering means on said heating plate to register said lens portion of said preheated blank with said surface of said forming member, means for effecting a forming stroke of said forming member with respect to said gripping means, a holding member having a surface conforming with the outer surface of said lens portion, and means for maintaining said holding member and said forming member in clamping relation with said lens portion during said forming stroke and with greater pressure than the pressure of said gripping means on said heated portion of said blank to minimize deformation and the development of strains in said lens portion.

11. The method of drawing from a blank of thermoplastic sheet plastic material a goggle of generally cup-shape having the lens area thereof integral with a frame portion of substantial depth including an inner edge adapted to fit the face of the wearer, which comprises the steps of applying softening heat to said blank, gripping the portion of said blank surrounding the lens forming area thereof with predetermined limited pressure, engaging said lens forming area of said blank with a male drawing member proportioned to define the inner configuration of the lens portion of said goggle and having a smooth end surface defining the inside of said lens, clamping said lens area of said blank against said end surface of said drawing member with substantially greater pressure than said predetermined pressure by means of a clamping member having a smooth surface defining the outside of said lens of said goggle, and causing relative drawing movement of said drawing member and said gripped portion of said blank while maintaining said clamping action on said lens area to confine the resulting drawing action on said blank to said gripped portion thereof and thereby to prevent deformation of said lens and the development of optical strains therein.

12. The method of drawing from a blank of thermoplastic sheet plastic material a goggle of generally cup-shape having the lens area thereof integral with a frame portion of substantial depth including an inner edge adapted to fit the face of the wearer, which comprises the steps of applying softening heat to said blank, gripping said blank with predetermined pressure between annular gripping members having aligned central openings corresponding to the lens area of said goggle, engaging said lens area of said blank with a male drawing member proportioned to define the inner configuration of the lens portion of said goggle and having a smooth end surface defining the inside of said lens, clamping said lens area of said blank against said end surface of said drawing member with substantially greater pressure than said predetermined pressure by means of a clamping member having a smoothe surface defining the outside of said lens of said goggle, and causing conjoint drawing movement of said drawing member and said clamping member with respect to said gripping members while maintaining said clamping action on said lens area of said blank to confine the resulting drawing action on said blank to said gripped portion thereof and thereby to prevent deformation of said lens and the development of optical strains therein.

13. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, applying drawing members to said heated blank portion to form the frame portion of said goggle, clamping said lens portion between smooth clamping surfaces during said frame forming step to prevent deformation thereof and the development of optical strains therein, and maintaining greater pressure on said lens portion than on said outside blank portion during said frame forming step to confine the drawing action in said blank to said outside portion.

14. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, applying drawing members to said heated blank portion to form the frame portion of said goggle, clamping said lens portion between smooth clamping surfaces during said frame forming step to prevent deformation thereof and the development of optical strains therein, maintaining greater pressure on said lens portion than on said outside blank portion during said frame forming step to confine the drawing action on said blank to said outside portion, and maintaining said goggle in contact with said drawing members and said clamping surfaces following said frame forming step to effect setting of said plastic.

15. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, applying drawing members to said heated blank portion to form the frame portion of said goggle, and simultaneously maintaining said lens portion of said blank at a temperature substantially below the softening range of said sheet to limit the frame forming action of said drawing members to said outside portion of said blank.

16. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, gripping said heated portion of said blank between annular gripping members, applying heat to said gripping members, clamping said lens portion of said blank between a male drawing member and a clamping member of substantially the same configuration as said lens area, moving said male drawing member through said gripping members to form said heated portion of said blank into the frame portion of said goggle, and maintaining said male drawing member and said clamping member in clamping relation with said blank during said frame forming step and with greater pressure therebetween than the pressure applied on said gripped portion of said blank to confine the drawing action on said blank to said outside portion and thereby to prevent deformation of said lens portion and the development of optical strains therein.

17. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, gripping said heated portion of said blank between annular gripping members, applying heat to said gripping members, clamping said lens portion of said blank between a male drawing member and a clamping member having substantially optically smooth surfaces of substantially the same configuration as said lens area, moving said male drawing member through said gripping members to form said heated portion of said blank into the frame portion of said goggle while maintaining said clamping action on said lens portion of said blank, and applying heat to said surfaces of said male drawing member and said clamping member to cause softening and press polishing of the surfaces of said lens area during said frame forming step.

18. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, gripping said heated portion of said blank between a pair of heated gripping members, clamping said lens portion of said blank between a pair of unheated forming members with greater pressure than the pressure on said heated blank portion, and effecting relative movement of said pairs of members while maintaining each said pair in said gripping and clamping relationship respectively with said blank to form said heated blank portion into the frame of said goggle while preventing distortion of said lens portion and the development of optical strains therein.

19. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying heat only to the portion of said blank outside said lens portion, gripping said heated portion of said blank between a pair of heated gripping members, clamping said lens portion of said blank between a pair of forming members with greater pressure than the pressure on said heated blank portion, effecting relative movement of said pairs of members while maintaining each said pair in said gripping and clamping relationships respectively with said blank to form said heated blank portion into the frame of said goggle, and maintaining said forming members at a temperature below the softening range of said plastic to limit the frame forming action of said members to said outside portion of said blank.

20. The method of drawing from a blank of thermoplastic sheet plastic material a goggle of generally cup-shape having the lens portion thereof integral with a frame portion of substantial depth including an inner edge portion adapted to fit the face of the wearer, comprising the steps of applying softening heat only to the portion of said blank outside said lens portion, gripping said heated portion of said blank between a pair of heated gripping members, clamping said lens portion of said blank between a pair of forming members having substantially optically smooth clamping surfaces with greater pressure than the pressure of said heated gripping members on said blank, effecting relative movement of said pairs of members while maintaining each said pair in said gripping and clamping relationships respectively with said blank to form said heated blank portion into the frame of said goggle while preventing distortion of said lens area, applying heat to said pair of forming members during said frame forming step to effect press polishing of the surfaces of said lens portion, and maintaining the temperature of said forming members sufficiently low to effect softening of only the surfaces of said lens area during said forming step.

References Cited in the file of this patent

UNITED STATES PATENTS

| Number | Name | Date |
| --- | --- | --- |
| 893,739 | Latham | July 21, 1908 |
| 1,220,600 | Burke | Mar. 27, 1917 |
| 1,461,071 | Shumacher | July 10, 1923 |
| 2,255,116 | Helmstaedter | Sept. 9, 1941 |
| 2,260,667 | Hoof | Oct. 28, 1941 |
| 2,332,674 | Smith | Oct. 26, 1943 |
| 2,358,934 | Lee | Sept. 26, 1944 |
| 2,393,533 | Heinz | Jan. 22, 1946 |
| 2,516,373 | Ehlert et al. | July 25, 1950 |
| 2,560,855 | Flanagan | July 17, 1951 |